Aug. 16, 1927.　　　O. SCHMITT　　　1,639,311
APPARATUS FOR MAKING ELECTRICAL MINE IGNITERS

Filed Sept. 14, 1926

Patented Aug. 16, 1927.

1,639,311

UNITED STATES PATENT OFFICE.

OTTO SCHMITT, OF SCHONBECK, GERMANY.

APPARATUS FOR MAKING ELECTRICAL MINE IGNITERS.

Application filed September 14, 1926, Serial No. 135,472, and in Germany December 12, 1925.

The making of electrical mine igniters from continuous strips of metal by punching and subsequently cutting up the said strip into individual igniters is well known. When producing such igniters it is necessary to position and fasten the filament in the grooves provided in the parts of the strips which serve as poles of the igniters. This work has been hitherto done by hand and it has been exceedingly difficult to produce an effective and durable connection. Bearing in mind that the filaments of the individual igniters must be all uniform in order to insure series ignition it will be obvious that the work of attaching the filament when done by hand requires great care and skill.

To facilitate this work and produce a very effective and durable connection I provide an apparatus which constitutes the subject of this invention.

In the accompanying drawing in which similar reference characters denote corresponding parts—

Figure 1:
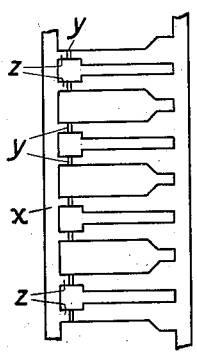
Fig. 1 illustrates a punched out metal strip from which the individual igniters are produced.

4 denotes the well known punched out sheet metal strip of the shape shown in Fig. 1 formed with a series of grooves $y$ arranged in alignment with one another in the narrow parts $z$ which after cutting off the adjacent longitudinal edge $x$ and cutting up the strip into separate sections form individual igniters to serve as the poles thereof.

Figure 2:
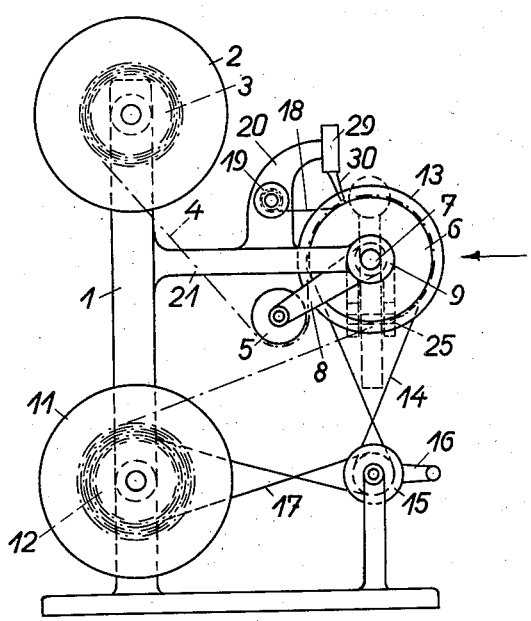
Fig. 2 is a side view of my apparatus for attaching the filament to said strip.
Figure 3:
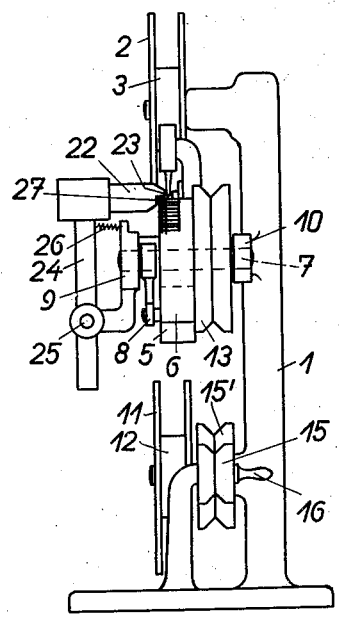
Fig. 3 is an end view thereof.

1 denotes the frame of the apparatus on which is revolubly supported a spool 2 around the hub 3 of which the metal strip 4 is wound as shown in Fig. 2. This strip 4 is conveyed over a guide and tension roller 5 onto a second spool 6 rotating on a spindle 7. This spindle is supported in an arm 21 of the frame and has fixed to it a bracket arm 8 carrying said guide roller 5. The ends of the spindle are supported in bearings 9, 10 (Fig. 2). 11 denotes another spool around the hub 12 of which the metal strip is wound after the attachment of the filament thereto. The spool 6 is rotated by a crank 16 through the medium of a crossed cord 14, running over pulleys 13, 15, of which pulley 13 is concentrically attached to the spool 6. Another crossed cord 17 running over the pulley 15 and a pulley attached to the spool 11 transmits motion to the latter. The filament 18 is wound around a small spool 19 supported on a bracket 20 projecting from the arm 21 of the frame 1. Projecting downwardly from the spindle 7 is an arm in the free end of which is pivotally mounted as at 25 an arm 24 to be capable of swinging vertically toward and away from the spool 6. A soldering member 22 supported on the upper end of said arm 24 is formed with a nose 23 which is adapted to project over the spool 6 and properly guide the strip 4 and filament 18 during the soldering process. A spring 26 fixed to the frame 1 and to the arm 24 has the tendency to draw the soldering iron into working position, a stop 27 being provided on the soldering iron to limit the movement thereof. Thus the soldering iron is yieldingly supported, and by turning the arm 24 away from the spool 6 can be removed from operative position to give access to the parts to be joined in case of some trouble. At the upper end of the arm 24 is provided a receptacle 29 to contain molten solder. This solder is applied to the strip 4 and filament 18 from the receptacle through a pipe 30, so that the filament on engaging the grooves $y$ of the parts $z$ of the strip which are to serve as poles of the igniters becomes effectively joined.

What I claim is:—

1. An apparatus for positioning a filament in notches of a previously formed and notched strip comprising a frame, a rotary spool carrying said strip, a guide and tension roller for said strip, a driven spool to receive said strip from said first-named spool, a roller carrying the filament and from which the latter is conveyed to said driven spool, a soldering iron having means for guiding the filament and strip at the point of juncture to position said filament in the notches of said strip, a receptacle containing molten solder and a feed leading from said receptacle to the point of juncture and feeding said solder to the parts to be soldered.

2. An apparatus for positioning a filament in notches of a previously formed punched and notched strip comprising a frame, a rotary spool carrying said strip, a guide and tension roller for said strip, a driven spool to receive said strip from said first-named spool, a roller carrying the filament and from which the latter is conveyed to said driven spool, a yieldingly supported soldering iron having means for guiding the filament and strip at the point of juncture to position said filament in the notches of said strip, a receptacle containing molten solder and a feed leading from said receptacle to the point of juncture and feeding said solder to the parts to be soldered.

3. An apparatus for positioning a filament in notches of a previously formed punched and notched strip comprising a driven means onto which said strip and filament are continuously fed, and soldering means having means for guiding said strip and filament to position the latter in the notches of said strip during the soldering process and a feed conveying molten solder to the parts to be joined together.

In testimony whereof I affix my signature.

OTTO SCHMITT.